Figure 1:
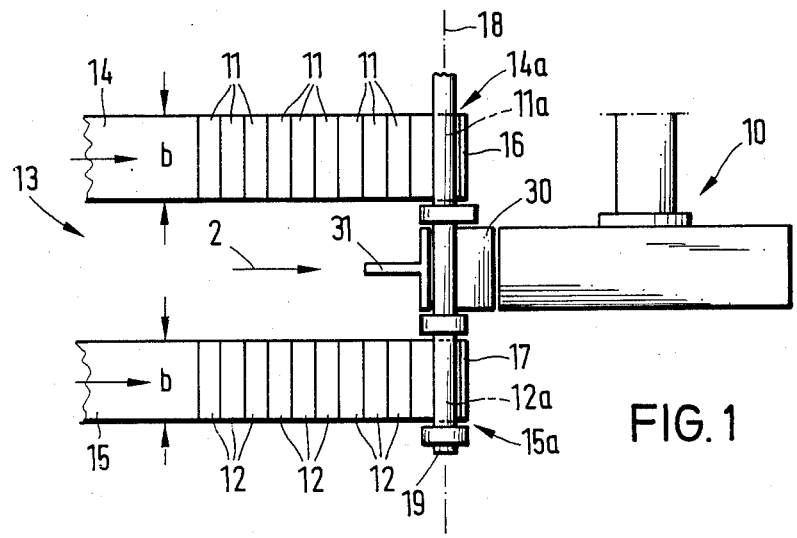

United States Patent [19]

Rütter

[11] Patent Number: 4,621,725
[45] Date of Patent: Nov. 11, 1986

[54] APPARATUS FOR FEEDING ARTICLES TO A PACKAGING STATION

[75] Inventor: Karl J. Rütter, Pulheim, Fed. Rep. of Germany

[73] Assignee: ROSE Verpackungsmaschinenfabrik theegarten GmbH & Co. KG, Cologne, Fed. Rep. of Germany

[21] Appl. No.: 722,608

[22] Filed: Apr. 12, 1985

[30] Foreign Application Priority Data

May 4, 1984 [DE] Fed. Rep. of Germany ....... 3416499

[51] Int. Cl.$^4$ .............................................. B65G 47/26
[52] U.S. Cl. ..................................... 198/448; 198/436
[58] Field of Search ............... 198/448, 436, 447, 457, 198/468.1, 601, 740

[56] References Cited

U.S. PATENT DOCUMENTS 2,320,934  6/1943  James et al. ......................... 198/448
4,194,614  3/1980  Hrivnak ............................. 198/468.1

FOREIGN PATENT DOCUMENTS 1443079  7/1976  United Kingdom .

Primary Examiner—Joseph E. Valenza
Assistant Examiner—Kyle E. Shane
Attorney, Agent, or Firm—Body, Vickers & Daniels

[57] ABSTRACT

Apparatus for feeding articles to a packaging station comprises two longitudinal conveyors which are arranged next to one another, and a cross-slide which extends over both conveyors at the leading ends thereof. The cross-slide alternately advances the articles located at the front ends of the conveyors to a pushing-in device which is arranged between the two conveyors and which pushes the articles into the packaging station. The cross-slide has engagement fingers and is rotatable about its longitudinal axis, so that each time one of the engagement fingers is rotated to engage behind an article on one of the conveyors, the other engagement finger is rotated to travel over and beyond the article on the other conveyor.

3 Claims, 9 Drawing Figures

APPARATUS FOR FEEDING ARTICLES TO A PACKAGING STATION

The invention relates to an apparatus for feeding articles, especially those with a sensitive surface, such as chocolate or sweets, to a packaging station, such as a wrapping device or the like, with two longitudinal conveyors arranged next to one another and with a transfer device which guides the articles fed to it alternately by the two conveyors into the packaging station one after the other.

Articles having a sensitive surface, as arises, for example, in the case of chocolate bars or the like, cannot be gripped when conveyed, but are transported merely resting freely on a conveyor. In intermittent conveyance, this results in the disadvantage that, when the articles are accelerated from the position of rest, the conveying surface, for example a conveyor belt, slips along a short distance under the articles before these are taken up, this occurring especially where articles of low weight are concerned. The conveying speed is therefore limited to a specific number of articles per minute.

On the other hand, modern packaging machines, for example wrapping machines which wrap a piece of paper or a metal foil round the articles to be packaged, can process a substantially higher quantity. Many attempts have therefore been made to use several conveyors to provide the quantity of articles which can be handled by a packaging machine. Thus, for example, it is known (German Patent Specification No. 2,510,394) to feed articles to a packaging machine by means of two longitudinal conveyors which are arranged parallel and next to one another and which are charged at a distance of somewhat more than double the length of an article, the vacant positions of one conveyor being filled with the articles of the other conveyor which, by means of a rotating conveyor belt placed obliquely relative to the direction of transport of the conveyor chain, are transferred onto the conveyor belt running immediately next to it. The conveying rate of a longitudinal conveyor per unit of time is doubled as a result, but it is difficult for the articles fed at high speed to the packaging station by the continuously running conveyor to be removed one after the other from the conveyor and introduced into the packaging machine.

Another feed apparatus likewise makes use of two longitudinal conveyors which both simultaneously deliver the articles transported by them to a disc feeder which rotates intermittently and from which the articles are then introduced into the packaging machine. This construction is relatively complicated and expensive, since a special drive mechanism and a feeding-in device coordinated with this for the packaging machine have to be provided for the disc feeder additionally required.

The object of the invention is to provide a simple and reliably operating apparatus for feeding articles to a packaging machine, by means of which even articles with a sensitive surface which can only be transported slowly can be fed to a packaging machine in as large a number per unit of time as can be handled by a high-performance packaging machine.

This object is achieved by the invention, when at the ends of the longitudinal conveyors facing the packaging station there is a cross-slide which extends transversely over the two conveyors and is movable to and fro and which has at its ends pivotable engagement means which alternately engage behind the articles lying in the same vertical plane on the two longitudinal conveyors and located nearest to the packaging station and present them to a pushing-in device arranged between the longitudinal conveyors and pushing the articles presented to it into the packaging station.

This design of a feed apparatus makes it possible to introduce the articles supplied simultaneously by two longitudinal conveyors into the packaging machine directly and reliably at high speed, since the cross-slide removes an article from the longitudinal conveyors during each of its strokes and can thereby work twice as quickly as the longitudinal conveyors. The pushing-in device used can be a mechanical striker or a pneumatically operating pushing-in device which can transport the article presented exactly to it by the cross-slide into the packaging machine accurately and at high speed. There is no need for an intermediate store in the form of a star feeder or the like. Furthermore, the cross-slide can easily be controlled mechanically or hydraulically.

The engagement means are appropriately connected firmly in various angular positions to the cross-slide which is rotatable about its longitudinal axis and which is controlled so that before each stroke it executes an angular rotation, as a result of which one engagement means is pivoted into the cross-sliding path of the articles and the other engagement means is pivoted out of it. Then, during its foward movement, the cross-slide engages behind an article on one longitudinal conveyor via its engagement means at the rear in the cross-sliding direction, whilst the swung-up engagement means located at the other end of the cross-slide slides over and beyond the article just pushed forward on the other longitudinal conveyor. Then, before the return movement of the cross-slide takes place, the other engagement means is pivoted into the cross-sliding path and then engages behind the article on the other longitudinal conveyor and pushes it in front of the pushing-in device, whilst the engagement means at the opposite end, in the swung-up position, is again guided over and beyond the next article following on the first longitudinal conveyor. Thus, before each longitudinal movement, the cross-slide executes an angular rotation about its longitudinal axis, with the result that the particular engagement means required is pivoted into the cross-sliding path and the engagement means not needed is pivoted out of the cross-sliding path.

So that the articles do not jump or tilt up when shifted transversely in front of the pushing-in device, the cross-slide has in its central region two stops, one of which has the same angular position as the engagement means at one end of the cross-slide and the other of which has the same angular position as the engagement means at the other end of the cross-slide. Furthermore, the two stops are at a distance from the engagement means assigned to them which corresponds to the width of the articles tcansversely to the conveying direction of the longitudinal conveyors. Each article is therefore retained on both sides and consequently guided securely when it is shifted transversely.

A particularly simple construction is obtained when the two stops are arranged together on a disc which is connected firmly to the cross-slide and one end face of which forms one stop and the other end face the other stop.

It is appropriate if the cross-slide is located above the two conveyors, so that the pushing-in device can operate in a longitudinal direction of the conveyors and push the articles approximately horizontally into the packaging station. However, it is also possible to arrange the cross-slide in front of the end faces of the longitudinal conveyors and then make the pushing-in device work upwards or obliquely downwards, when the packaging station is arranged above or below the longitudinal conveyors. Where specific packaging machines are concerned, it may also be expedient if the pushing-in device introduces the articles into a transfer turret provided with a plurality of grab devices which are arranged on its periphery and by means of which the articles received can be rotated before being introduced into the packaging machine and can be brought into the position most favourable for packaging.

Further features and advantages of the invention emerge from the following description and the drawings, in which a preferred embodiment of the invention is explained in more detail by means of an example. In the drawings:

FIG. 1 shows, in a diagrammatic plan view, a feed apparatus according to the invention and the packaging station, FIGS. 2a to 2d show a view of the cross-slide in the direction of the arrow 2 in four different working positions, and FIGS. 3a to 3d show the positions of the engagement means arranged on the cross-slide in their various angular positions in the different working positions of the cross-slide, as seen in the direction of the arrows 3.

In the drawings, 10 denotes a packaging station for wrapping identical articles 11 and 12 which are supplied to the packaging station 10 by means of a feed apparatus designated as a whole by 13. In the present case, the articles are chocolate bars with a sensitive surface which, resting close to one another, are fed to the packaging station 10 in the direction of the arrow 2 by two longitudinal conveyors 14 and 15. Each longitudinal conveyor 14, 15 has a continuously rotating conveyor belt not shown in any more detail here, on which rest the articles 11, 12 pushed against a fixed stop 16 or 17 at the end 14a or 15a of each conveyor facing the packaging station 10.

The two longitudinal conveyors 14 and 15 are arranged at a lateral distance from one another, the gap 18 between these two conveyors being somewhat wider than the width b of the articles 11, 12 transversely to the longitudinal direction of the conveyors 14 and 15.

Figure 2A:
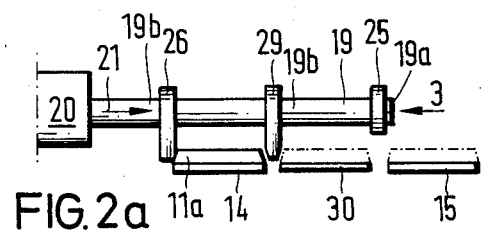
Figure 2B:
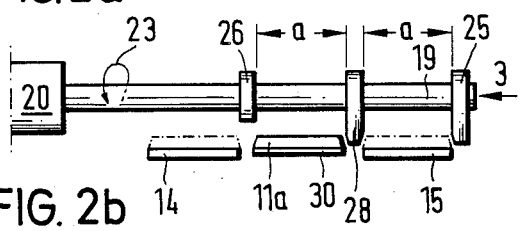
Figure 2C:
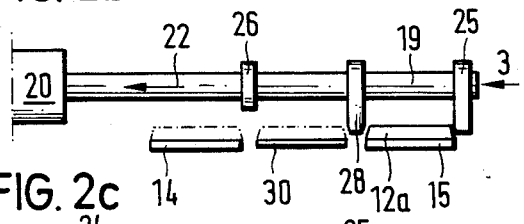
Figure 2D:
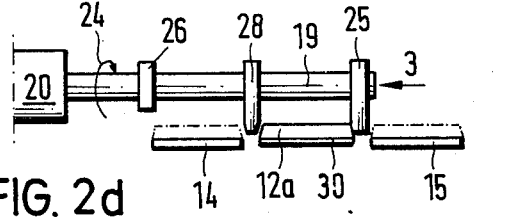

Arranged above the articles 11a and 12a, which rest respectively against the stops 16 and 17 and lie in the same vertical plane on the two longitudinal conveyors 14 and 15 and which are located nearest to the packagfng station 10, is a cross-slide 19 which extends transversely above the two conveyors 14 and 15 and is displaceable to and fro by means of a drive 20 merely indicated in FIGS. 2a to 2d in its longitudinal direction, and consequently transversely to the conveying direction 2 of the longitudinal conveyors 14 and 15, in the direction of the arrows 21 and 22 and which is rotatable about its longitudinal axis into different angular positions, as indicated by the arrows 23 and 24 in FIGS. 2b and 2d. The cross-slide 19 carries respectively at its two ends 19a and 19b engagement means 25 and 26 which are offset at an angle of 60° relative to one another and which project downwards into the height of the foremost articles 11a and 12a resting on the longitudinal conveyors 14 and 15. In its central region 19b, the cross-slide 19 carries a disc 27 with two stops 28 and 29. Like the engagement means 25 and 26, the disc 27 is connected fixedly in terms of rotation to the cross-slide 19 and is arranged on the latter in such a way that the stop 28 assumes the same angular position on the cross-slide as the engagement means 25 at one end 19a and the stop 29 has the same angular position as the engagement means 26 at the other end 19b of the cross-slide 19. The two stops 28 and 29 are at a clear distance a from the engagement means 25 and 26 respectively assigned to them which corresponds to the width b of the articles 11 and 12 transversely to the conveying direction of the longitudinal conveyors 14 and 15.

Underneath the cross-slide 19, there is between the longitudinal conveyors 14 and 15 and at the same height as these a serving table 30, in front of which is located a pushing-in device 31 which can move forwards and backwards in the direction of the arrow 2 and which pushes the articles 11 or 12 presented to it on the serving table 30 into the packaging station 10 in the direction of the arrow 2. The pushing-in device can act or be actuated mechanically or pneumatically, and the packaging station 10 can have various designs, for example can be equipped with several grabs which are arranged on the periphery of an intermittently relaying turret and retain the articles in various positions during wrapping and which interact with other packaging tools arranged in the stations through which the articles pass.

The mode of operation of the apparatus is as follows:

Of the articles 11 and 12 advanced continuously on the longitudinal conveyors 14 and 15, the article 11a located nearest to the packaging station is first grasped on the conveyor 14 by the engagement means 26 and pushed forward transversely to the longitudinal direction of the conveyors into the gap 18 between the two conveyors and onto the serving table in the direction of the arrow 21. At the same time, the cross-slide 19 is in the position shown in FIG. 2a, in which the engagement means 25 and 26 and the stops 28 and 29 assume the positions shown in FIG. 3, in which the engagement means 26 is directed downwards and engages behind the article 11a on the outside of the conveyor 14 and the stop 29 points downwards, and the inner edge of the article 11a can come up against the stop and thereby be guided during its advance. During this transverse shift in the direction of the arrow 21, the engagement means 25 is located at the front end 19a of the cross-slide 19 and the stop 28 belonging to it is in a swung-up position, in which the engagement means 25 can slide over and beyond the article 12a located at the front on the conveyor 15.

As soon as the article 11a has been placed on the table 30, the pushing-in device 31 pushes it in the direction of the arrow 2 into the packaging station 10 at high speed. At the same time, the cross-slide 19 in FIG. 3b rotates 60° in an anti-clockwise direction, with the result that the engagement means 25 arranged at the right-hand end 19a and the stop 28 assigned to it swing down into their vertical position, and the rear engagement means 26 at the end 19b of the cross-slide 19 and the stop 29 assigned to it swing up in a clockwise direction and assume the position shown in FIG. 3b.

The cross-slide 19 is then moved back in the direction of the arrow 22, and the engagement means 25 engages behind the outside of the article 12a located at the front on the conveyor 15 and pushes it, together with the stop 28, onto the serving table 30 (FIG. 2d).

Figure 3A:
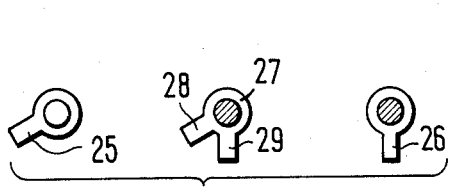
Figure 3B:
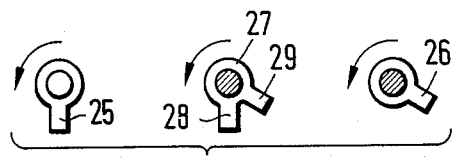
Figure 3C:
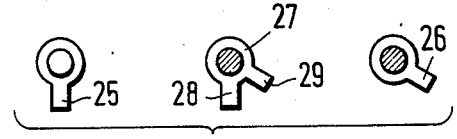
Figure 3D:

The cross-slide 19 is then rotated 60° in the clockwise direction in FIG. 3d, until the engagement means 25 and 26 and the stops 28 and 29 again assume their position shown in FIG. 3a, in which the presentation cycle can start again.

It will be seen that the pushing-in device 31 can operate at a very high speed, since the cross-slide, during each stroke, alternately removes an article from one of the two longitudinal conveyors 14 and 15, so that the articles 11 and 12 can be fed to the packaging station 10 at a speed which is twice as high as the feed speed of the longitudinal conveyors 14 and 15.

The invention is not restricted to the exemplary embodiment illustrated and described, but several changes and additions are possible without departing from the scope of the invention. For example, the packaging station 10 can also be of different design, and it is possible to use other types of pushing-in devices. Instead of a disc 27 with two stops, separate stops can also be arranged on the cross-slide.

What is claimed is:

1. Apparatus for feeding articles, especially those with a sensitive surface, such as chocolates or sweets, to a packaging station, such as a wrapping device or the like, with two longitudinal conveyors arranged next to one another and with a transfer device which guides the articles supplied alternately by the two conveyors into the packaging station one after the other, characterized in that at the ends (14a and 15a) of the longitudinal conveyors (14 and 15) facing the packaging station (10) there is a cross-slide (19) which extends transversely over the two conveyors (14, 15) and is movable to and fro and which has at its ends (19a, 19b) pivotable engagement means (25, 26) which alternately engage behind the articles (11a, 12a) lying in the same vertical plane (18) on the two longitudinal conveyors (14, 15) and located nearest to the packaging station (10) and present them to a pushing-in device (31) arranged between the longitudinal conveyors (14, 15) and pushing the articles (11a, 12a) presented to it into the packaging station (10), said engagement means (25, 26) being connected firmly in various angular positions to the cross-slide (19) which is rotatable about its longitudinal axis and which is controlled in such a way that during each stroke it executes an angular rotation, as a result of which one engagement means (25 or 26) is povited into the crosssliding path of the articles (11a, 12a) and the other engagement means (26 or 25) is pivoted out of it.

2. Apparatus according to claim 1, characterised in that the cross-slide (19) has in its central region (19b) two stops (28, 29), one (28) of which has the same angular position as the engagement means (25) at one end (19a) of the cross-slide (19) and the other (29) of which has the same angular position as the engagement means (26) at the other end (19b) of the cross-slide (19), and in that the two stops (28, 29) are at a distance (a) from the engagement means (25 and 26) assigned to them which corresponds to the width (b) of the articles (11a, 12a) transversely to the conveying direction (2) of the longitudinal conveyors (14, 15).

3. Apparatus according to claim 2, characterised in that the two stops (28, 29) are arranged together on a disc (27) which is connected firmly to the cross-slide (19).

* * * * *